(12) United States Patent
Anghel et al.

(10) Patent No.: US 8,427,001 B2
(45) Date of Patent: Apr. 23, 2013

(54) ELECTRICALLY CONTROLLED FREQUENCY-BASED POWER SYSTEM ARCHITECTURE FOR AIRCRAFT

(75) Inventors: Cristian Anghel, Oro Valley, AZ (US); Ming Xu, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1301 days.

(21) Appl. No.: 12/182,423

(22) Filed: Jul. 30, 2008

(65) Prior Publication Data

US 2010/0026089 A1 Feb. 4, 2010

(51) Int. Cl.
*B60L 1/00* (2006.01)

(52) U.S. Cl.
USPC .............................. 307/9.1; 307/86

(58) Field of Classification Search .............. 307/11, 307/86, 87, 129, 9.1; 322/29, 32
See application file for complete search history.

(56) References Cited

U.S. PATENT DOCUMENTS

| | | | | |
|---|---|---|---|---|
| 3,908,130 A * | 9/1975 | Lafuze | | 290/46 |
| 4,308,465 A * | 12/1981 | Lafuze | | 307/87 |
| 5,034,638 A * | 7/1991 | McCabria | | 310/54 |
| 5,594,322 A | 1/1997 | Rozman et al. | | |
| 5,959,852 A * | 9/1999 | Deloy et al. | | 363/45 |
| 6,820,728 B2 | 11/2004 | Raad | | |
| 7,254,465 B2 * | 8/2007 | McGinley | | 700/295 |

* cited by examiner

Primary Examiner — Fritz M Fleming
(74) Attorney, Agent, or Firm — shimokaji & Assoc. PC

(57) ABSTRACT

An electrical power system and method utilizing a controlled frequency generator (CFG) that creates an electrical output with a constant frequency is disclosed. More specifically, an electrical power system and method utilizing controlled frequency to provide no break power to the various aircraft electrical power components as well as providing starting power to the main engine and the auxiliary power unit. An electrical power system in accordance with the present invention eliminates various unnecessary AC and DC conversions by generating a more user friendly electrical output at a constant frequency to be usable by various aircraft components such as the air compressor, electronics, hydraulic pressure, and air conditioning. Moreover, the current electrical power system architecture can also be used to provide main engine and auxiliary power unit starting power utilizing the constant frequency.

19 Claims, 4 Drawing Sheets

ELECTRICALLY CONTROLLED FREQUENCY-BASED POWER SYSTEM ARCHITECTURE FOR AIRCRAFT

BACKGROUND OF THE INVENTION

The present invention relates to an electrical power system architecture and, more particularly, relates to a method and an apparatus for an improved electrical power system architecture utilizing a Controlled Frequency Generator (CFG).

The improved architecture utilizing a CFG may be capable of generating a constant frequency independent of the input shaft speed of a prime mover such as a main engine; thus creating a more universally usable electrical source for the various components of an electrical power system architecture and eliminating unnecessary conversion components. Additionally the architecture utilizing CFGs eliminates the traditional solution of using a hydro-mechanical 'transmission' to convert the variable engine speed to a constant speed at the generator input shaft. The hydro-mechanical 'transmission' is large, heavy, expensive, and has poor reliability. Many aircraft owners would prefer to have a smaller, simpler, and more reliable alternative.

Some of the existing aircraft system architectures, known as variable frequency (VF) systems, utilize a traditional power generator connected to the aircraft prime mover such as a main engine, and such traditional power generators can only generate an electrical output that varies with the input shaft speed. Because traditional power generators are connected to the input shaft, they are incapable of maintaining a constant output frequency, making the electrical output difficult to use by the various aircraft components. For example, it is commonly known in the aircraft industry that aircraft electrical system architectures have various components that require drastically different electrical power input. Components such as a cabin air compressor (CAC) may require an AC source at a variable frequency while another component such as the Hydraulic Pump (HYD) may require a different AC source at a constant frequency.

In order to convert the electrical output with a variable frequency into a constant frequency that is required by the various components of aircraft electrical system, the current art incorporates numerous burdensome components such as inverters, auto transformer rectifier units, and potentially complex voltage and frequency controlled circuits to achieve such a conversion. These components add to the weight, complexity, cost, and maintenance of aircraft electrical system architecture.

With the development of the CFG that are capable of generating a constant frequency independent of the input shaft speed of the prime mover such as a main engine, various electrical conversion and control components mentioned above such as the inverters, auto transformer rectifier units, generator control units, and potentially complex voltage and frequency controlled circuits are no longer needed. However, in order to take advantage of the benefits of a CFG, a special electrical power system architecture needs to be developed to address the needs of an aircraft electrical power system.

FIG. 1, shows a functional schematic block diagram of the prior art electrical power system showing the traditional aircraft architecture with variable frequency.

The prior art electrical power system architecture depicted in FIG. 1 contains an auxiliary starter generator (AUX SG) 100, a generator control unit (GCU) 101 for the auxiliary starter generator (AUX SG) 100, a main engine starter generator (MESG) 102, a generator control unit (GCU) 103 for the main engine starter generator (MESG) 102, an auto transformer unit (ATU) 104, an electrical bus 106, an auto transformer rectifier unit (ATRU) 108, a multifunction power controller (MFPC) 110 dedicated for the cabin air compressor (CAC) 114, a second multifunction power controller 112 dedicated for the hydraulic pumps (HYD) 116, and a start control unit (SCU) 118 to control the auxiliary starter generator (AUX SG) 100. Finally, FIG. 1 also contains an external ground cart 120, connected to the ATU 104 to provide an external source of power.

The AUX SG 100 here in the current prior art embodiment produces torque to start the auxiliary power unit (APU—not shown), which can be used to provide power to the aircraft electrical components when the main engine is not operational. The AUX SG 100 receives start power from the SCU 118 supplied by ATRU 108 via bus 106 which in turn is supplied from 115 VAC external power ground cart 120 via ATU 104. After start, in this prior art embodiment, the AUX SG 100 is connected to one of the electrical buses 106 to provide the power. Attached to the AUX SG 100 is a GCU 101 used to control the output voltage of the AUX SG 100 during generate mode.

Main engine starter generator (MESG) 102 in this prior art embodiment is connected to an electrical bus 106 to allow the electrical output from the MESG 102 to be transferred to various other components via electrical bus 106. However, because of the inherent limitations of a traditional prime mover such as a main engine (not shown), the frequency of the electrical output generated via the MESG 102 is variable and dependent on the shaft speed. It is also worth noting that the MESG 102, similar to the AUX SG 103, requires a GCU 101 as well.

Auto transformer unit (ATU) 104 is typically used to provide power transferred from the external power ground cart 120 for the various components of an aircraft when the other power generators are not active.

Electrical bus 106 in this prior art embodiment is used to transfer the electric power to and from the various components in this current electrical power system architecture. The electrical bus 106 can receive the electrical output of the prime mover such as a main engine (not shown) via the MESG 102, the electrical output from the auxiliary power unit (APU—not shown) via the AUX SG 100, or even from the external power ground power cart 120 via the ATU 104.

Auto transformer rectifier unit (ATRU) 108, in this prior art embodiment, is connected to the electrical bus 106 and can be used to transfer alternating current (AC) to direct current (DC) in order to convert the electrical output generated by the MESG 102. ½ Multifunction power controllers (½ MFPC) 110 and 112 are connected to the outlet of said ATRU 106, and they are used to convert the DC back into usable AC format, a preferred format for various aircraft components. It is also worth nothing that the ½ MFPC 110 and 112 can combine together to generate power to start the prime mover such as a main engine (not shown).

In this prior art embodiment, various aircraft components such as the cabin air compressor (CAC) 114, and the hydraulic pump (HYD) 116 connect to the output of the ½ MFPC 110 and 112.

Finally, the starter control unit (SCU) 118 in the prior art embodiment is connected to the outlet of the ATRU 108 to utilize the DC current output. The SCU 118 can be used to convert DC current back to AC current to power the AUX SG 100.

As it can be seen from FIG. 1, the traditional prior art approach to supplying power to the various aircraft components is not very effective, and requires various burdensome components to convert AC to DC then back to AC in an attempt to control frequency.

Although there have been other attempts in the aircraft industry to take advantage of the main engine power while maintaining a constant frequency, these solutions are flawed because they involve large cumbersome mechanical components such as a hydromechanical transmission. Hydromechanical transmissions are large, heavy, expensive, and have poor reliability; making them unsuitable for the aircraft industry where light weight, space saving, and reliable components are highly desirable.

Hence, it can be seen that there is a need for an innovative electrical power system architecture that utilizes the advantages of a controlled frequency generator (CFG) to generate an electrical output with a constant frequency, by eliminating unnecessary components to reduce weight, simplify the architecture, and increase reliability of the electrical power system architecture.

SUMMARY OF THE INVENTION

In one aspect of the present invention, an electrical power system comprises a controlled frequency generator to generate an engine electrical output and an electrical bus connected to the controlled frequency generator to receive the engine electrical output to yield a bus electrical output; wherein the electrical output from the controlled frequency generator is at a constant frequency, thereby allowing the electrical power system to operate without at least one of an auto transformer rectifier unit, a multifunction power controller, a generator control unit, and a starter control unit.

In another aspect of the invention, and by way of example only, a method of providing power to a plurality of aircraft system components in an electrical power system, the method comprises generating an engine electrical output at a constant frequency; and eliminating at least one of an auto transformer rectifier unit, a multifunction power controller, a generator control unit, and a starter controller unit by utilizing an excitation power controller from the electrical power system; wherein the excitation power controller directly utilizes the constant frequency.

In still another aspect of the invention, and by way of example only, an electrical power system comprises a controlled frequency generator to generate an engine electrical output, an electrical bus connected to the controlled frequency generator to receive the engine electrical output to yield a bus electrical output, and a second electrical bus connected in parallel to the electrical bus; wherein the engine electrical output from the controlled frequency generator is at a constant frequency, thereby allowing said electrical power system to operate without at least one of an auto transformer rectifier unit, a multifunction power controller, a generator control unit, and a starter control unit.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The current electrically controlled frequency based power system provides an improved system that utilizes a frequency controlled generator that is capable of producing electrical output at a constant frequency to power the various components within an aircraft system architecture without the need for heavy and burdensome components. This invention is unlike the prior art where multiple conversion components such as auto transformer rectifier units (ATRU) and multifunctional power controllers (MFPC) are required to convert the electrical output from AC to DC back to AC in order to control the frequency.

The current invention utilizes "A Generator with Quadratature AC Excitation" filed as U.S. patent application Ser. No. 11/758,163 referred to here as a controlled frequency generator, and hereby incorporated by reference.

Figure 1:
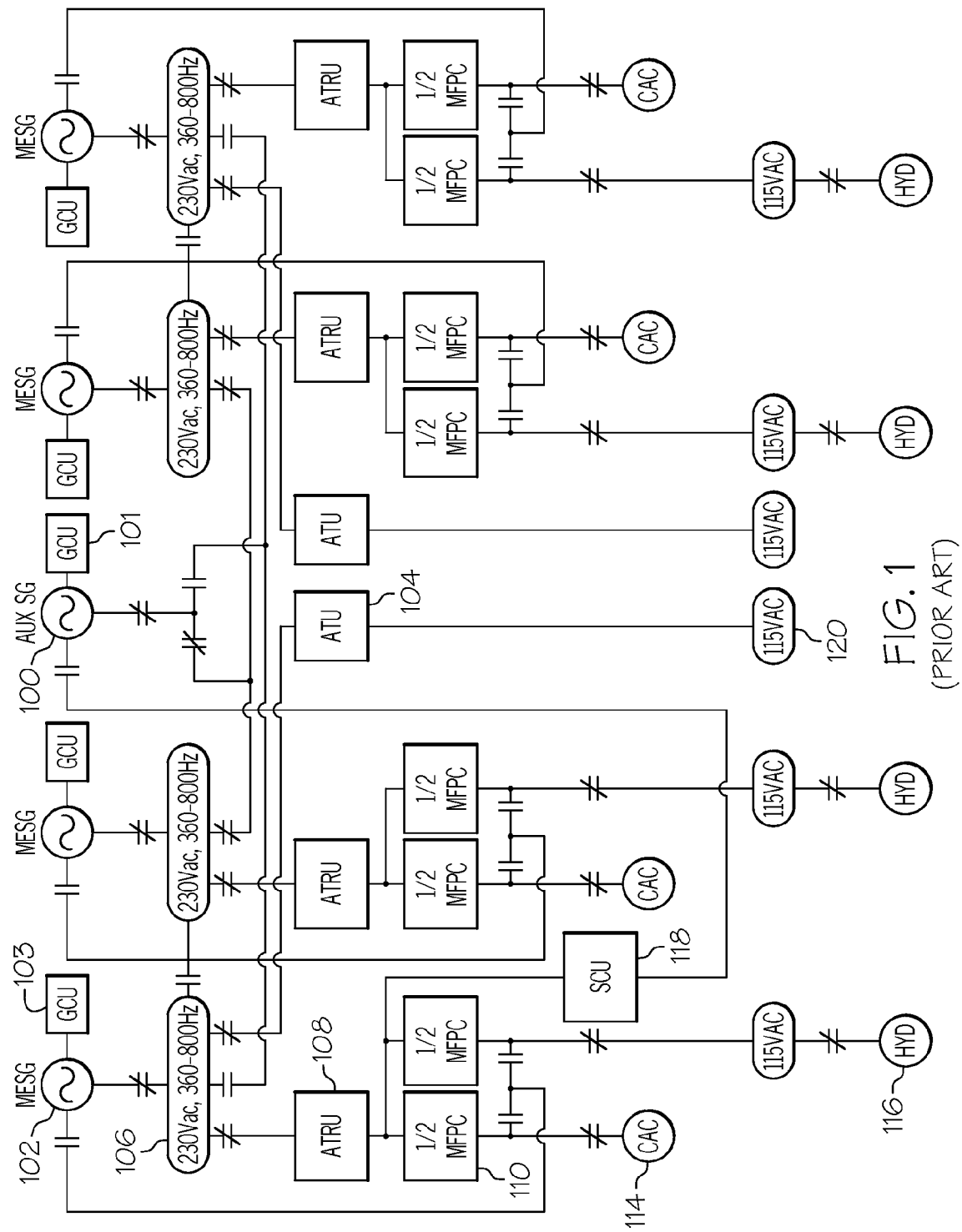
FIG. 1 is a functional block diagram of the prior art electrical power system architecture utilizing traditional power generators.
Figure 2:
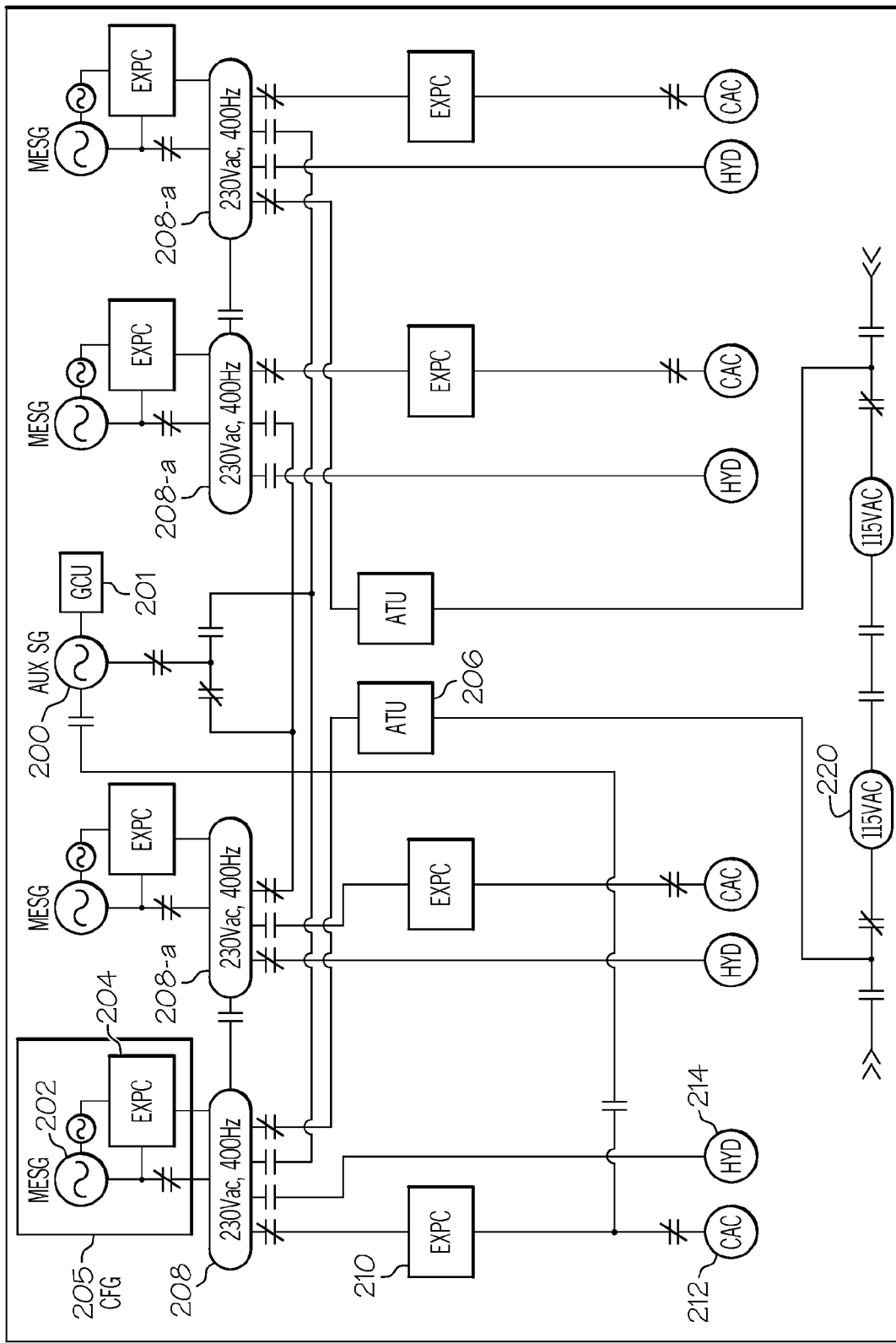
FIG. 2 is a functional block diagram of one embodiment of the current invention of an electrical power system architecture utilizing a controlled frequency generator (CFG)

FIG. 2 is a diagram of an exemplary embodiment in accordance with the current invention and distinguishes it from the prior art technology. FIG. 2 is a functional schematic block diagram of the current exemplary electric power system architecture utilizing a controlled frequency generator (CFG) 205 for an aircraft. It should be understood that the current invention, although shown in the exemplary embodiment in an aircraft context, could be applicable to aerospace systems, industrial environments, electromechanical vehicles, or any other electric system that is used in a complex environment without departing from the scope of the present invention.

FIG. 2 depicts an electrical power system 20 that may contain an AUX SG 200, a GCU 201 and a CFG 205 further comprising two additional components, namely a MESG 202 and an EXPO excitation power controller (hereinafter referred to as EXPC) 204. Electrical power system 20 may further contain an ATU 206, an electrical bus 208, an additional EXPC 210 connected between the electrical bus 208 and the CAC 212, and a HYD 214 connected directly to the electrical bus 206. It will be appreciated that the current exemplary embodiment could contain several other components such as capacitors, sensors, controllers, or other electrical components not depicted in FIG. 2 without departing from the scope of the present invention. However, a description of these additional components such as capacitors, sensors, controllers, or other electrical components, if included, is not necessary for a description of the invention and will therefore not be further depicted or described.

Elements 202, 204, 205, 206, 208, 210, 212, and 214 occur multiple times throughout FIG. 2 to replicate a two engine or four engine exemplary aircraft architecture. Elements 202, 204, 205, 206, 208, 210, 212, and 214 occur multiple times throughout FIG. 2 can also be utilized in a twin engine architecture with two generators per main engine. These additional replicated components are shown here for illustrative purposes only, as these components perform essentially the same functionality as their identically named counterparts and do not need further description.

The current invention disclosed in FIG. 2 may utilize a CFG 205; depicted by the combination of a MESG 202 and an EXPC 204 to reduce the number of components needed for an aircraft system architecture. The CFG 205 may allow the engine electrical output frequency to be at a constant frequency independent of the engine shaft speed. CFG 205 may allow the bus electrical output at the electrical bus 208 to be a constant frequency, rendering the bus electrical output automatically usable by the HYD 214, eliminating the ATRU and MFPC often present in conventional power system architectures. Moreover, the same bus electrical output from the electrical bus 208 can be controlled by a second EXPC 210 to render the bus electrical output to be more usable for the CAC 212, also eliminating the ATRU and MFPC often present in conventional power system architectures.

Turning now to the first component, the AUX SG 200 may help start the auxiliary power unit (APU—not shown) which may provide auxiliary electrical output to the various components of the aircraft such as air compressor, electronics, hydraulic pressure, and air conditioning. Here, in the current exemplary embodiment, the AUX SG 200 may also be connected to the electrical buses 208 to provide auxiliary electrical output for the various components of the aircraft via electrical bus 208 when the prime mover such as the main engine is not providing engine electrical output via CFG 205.

Attached to the AUX SG 200 may be a GCU 201. The GCU 201 may be used to control the voltage output of the AUX SG 200 during generate mode.

The MESG 202 in the current exemplary embodiment may combine with the EXPC 204 to form a CFG 205. The EXPC 204 may create a supplemental frequency to compensate for the variable frequency generated from the shaft of a prime mover such as a main engine (not shown) via the MESG 202 in order to create an engine electrical output with a constant frequency. In the current exemplary embodiment, the CFG 205 may keep the engine electrical output via MESG 202 at 230 Vac and frequency at the optimal setting of 400 Hz; however, the output frequency can be kept constant at 200 Hz, 300 Hz, 500 Hz, 600 Hz, or any constant frequency that is usable within an electrical architecture system without departing from the scope of the present invention.

The electrical bus 208 in the current exemplary embodiment may receive an engine electrical output with voltage of 230 Vac and a constant frequency of 400 Hz from the CFG 205 via MESG 202 electrical output. This constant frequency may make for an easily usable energy for the HYD 216 and other electrical loads requiring constant frequency. Electrical bus 208 may also receive an auxiliary electrical output from an auxiliary power unit (APU—not shown) via AUX SG 200, or an external electrical output from an external power ground cart 220.

Connected to one connector of the electrical bus 208 may be an additional EXPC, which may replace the ATRU and the MFPC often present in conventional power system architectures. These ATRU and MFPC are heavy, burdensome, and expensive; all undesirable characteristics for an aircraft in flight. Consequently, it is advantageous to replace the above mentioned components with a simple EXPC 210 that can be used when bus electrical output is maintained at a constant frequency without the heavy and burdensome components. When EXPC 210 is used to supply the CAC 212 its output frequency is varied by the CAC operation. Additionally, by utilizing an EXPC 210 that is similar to the EXPC 204 already in use in the CFG 205, the current architecture significantly reduces the production costs by eliminating new component parts.

In an alternative embodiment, the EXPC 210 can still utilize traditional components such as the auto transformer rectifier unit (ATRU) and the MFPC to provide the necessary conversion from constant frequency to a variable frequency without departing from the scope of the present invention. In this alternative embodiment wherein an ATRU and the MFPC are still used, the electrical power system 20 still benefits from the use of the CFG because it still eliminates components such as the GCU for the MESG 202.

Directly connected to the additional EXPC 210, or to the electrical bus 208, may be the CAC 212 of the current present invention. This direct connection could be interposed with various contactors (not shown) or other electrical components that do not change the functionality of the CAC 212. These contactors could be open, closed, or completely eliminated without departing from the scope of the present invention so long as it does not change the functionality of the CAC) 212. CAC 212, may provide cabin air pressure during the operation of an aircraft, which is important at high elevations where the air pressure can be significantly lower.

The HYD 214 in the present invention may be connected directly to electrical bus 208 without an ATRU or a MFPC often present in conventional power system architectures. This direct connection could be interposed with various contactors (not shown) or other electrical components that do not change the functionality of the HYD 214. These contactors could be open, closed, or completely eliminated without departing from the scope of the present invention so long as it does not change the functionality of the HYD 214. The current architecture may allow the HYD 214 to be connected directly to electrical bus 208 because the electrical output from the CF) 205 is already in a constant frequency readily usable by the HYD 214.

In addition to providing a more usable energy for the various electrical components in an aircraft such as the CAC 212 and the HYD 214 without the unnecessary conversion components, the present invention may also eliminate unnecessary components such as the GCU that are traditionally required to control the output voltage of the MESG 202 or AUX SG 200 in generate mode. The present invention architecture may utilize an already existent EXPC 204 to provide control to the power from electrical bus 208 and direct it to the MESG 202, which in turn may provide controlled frequency power or constant frequency power. The MESG 202 may also contain an exciter generator, which can be used to provide an excitation to the MESG 202. This current architecture may allow a smaller amount of power in the order of 5-7 kW to be controlled by the EXPC 204 and used during main engine start in combination with the large amount of power such as 50-75 kW supplied directly from the bus 208 without the need for an additional controller rated for 50-70 kW that is traditionally needed for starting the prime mover such as a main engine of an aircraft.

Another additional advantage of the current invention may be the ability to provide starting power to the AUX SG 200, which in turn can be used to start the auxiliary power unit. (APU—not shown) Utilizing the bus electrical output having a constant frequency generated by the CFG 205 or from the external power ground cart 220 via ATU 206, the current invention may be capable of directly using the electrical output from electrical bus 208 without the needs of a SCU that is traditionally required to start the auxiliary power unit (APU—not shown). The EXPC 210 is used for APU start instead of the traditional SCU. The AUX SG 200 may also contain an exciter generator, which can be used to provide an excitation to the AUX SG 200. The SCU, like many of the other components, is heavy, burdensome, and undesirable in an aircraft context. Consequently, it may be advantageous to remove unnecessary components to further increase efficiency of the electrically controlled frequency-based power system architecture.

Turning now to electrical bus 208-*a*, which is connected to electrical bus 208. The electrical bus 208 and a neighboring electrical bus 208-*a* may be connected in parallel to each other because they both have the same constant electrical output frequency as generated by the CFG 205. This type of parallel connection may be advantageous in allowing the various components to share power with each other as the individual components are being powered down during prime mover such as a main engine start. This type of parallel connection may allow for a "no-break" power transfer, meaning that the power supplied to the various electrical components such as the CAC 212 and the HYD 214 do not experience any interruptions even during prime mover or main engine start. Hence, the parallel connection of electrical bus 208 and the neighboring electrical bus 208-*a* may allow the electrical power system to interchangeably between an engine electrical output, an alternate engine electrical output, an auxiliary electrical output, or an external electrical output, or any other output within the electrical power system without departing from the scope of the present invention.

Figure 3:
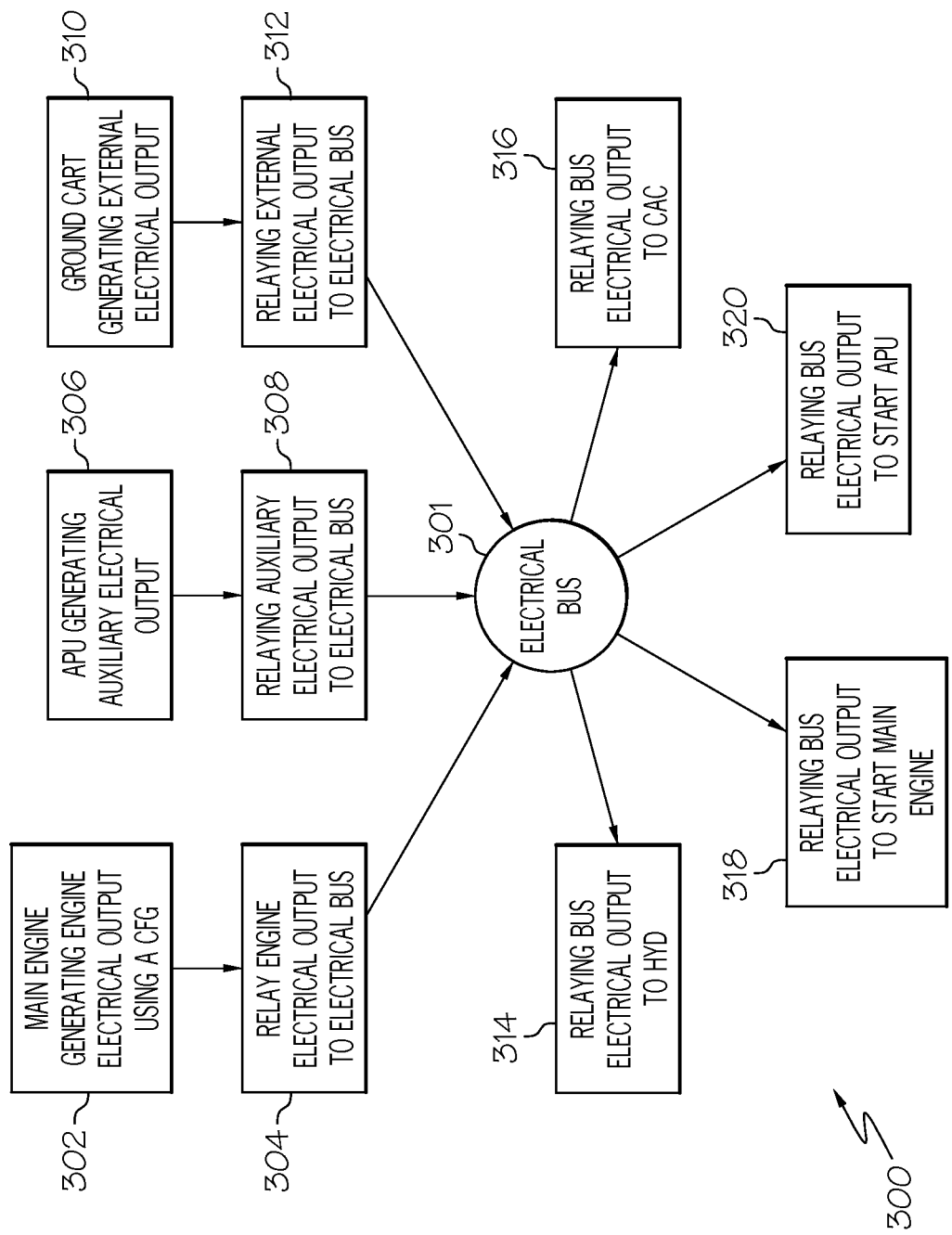
FIG. 3 is a flowchart depicting the operation of one embodiment of the current invention of an electrical power system architecture utilizing a controlled frequency generator (CFG)

FIG. 3 shows a method of generating a constant frequency electrical output in accordance with an exemplary embodiment of the current invention.

The method of operation 300 disclosed by FIG. 3 shows the current electrical power system deriving power from one of three sources. The first source may come from the main engine where the engine electrical output may be generated using a CFG at step 302, relayed to electrical bus 301 at step 304. The second source may come from an APU where an auxiliary electrical output may be generated at step 306, and relayed to electrical bus 301 at step 308. Finally, the third source may come from a ground cart where an external electrical output may be generated at step 310, and relayed to electrical bus 301 at step 312.

At step 301, the electrical bus may simply yield a bus electrical output based on either one of the three outputs mentioned above. Hence it can be seen that bus electrical output may be either an engine electrical output, an auxiliary electrical output, or an external electrical output depending on the operational state of an aircraft all without departing from the scope of the present invention.

At step 301, the electrical bus, upon receipt of the output, may relay the bus electrical output to a HYD at step 314, may relay the bus electrical output to a CAC at step 316, typically via an EXPC, may relay the bus electrical output to start the main engine at step 318, or may also relay the bus electrical output to start the APU at step 320.

Because the engine electrical output generated at step 302 is using a CFG, it is capable of producing an output at a constant frequency, making it interchangeable with auxiliary electrical output and external electrical output, both of which are already at a constant frequency.

Figure 4:
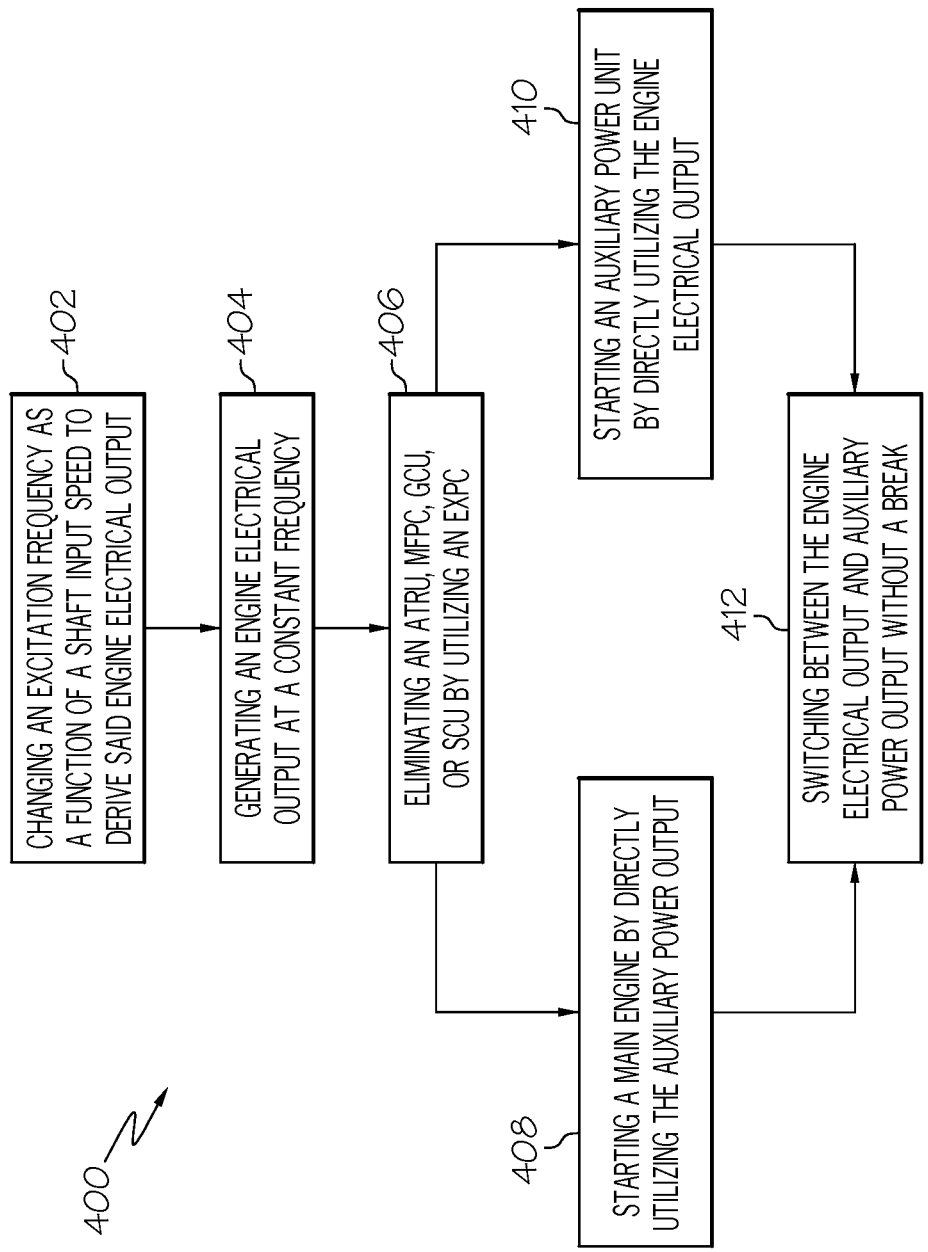
FIG. 4 is a flowchart depicting an exemplary method of providing power to a plurality of aircraft system components in accordance with the present invention.

The method 400 as disclosed by FIG. 4 shows an exemplary method of providing power to a plurality of aircraft system components in an electrical power system in accordance with the present invention. At step 402, an excitation frequency within the controlled frequency generator may be changed as a function of the shaft input speed to derive an engine electrical output. This excitation frequency may complement the electrical output generated by the shaft input to generating an engine electrical output at a constant frequency as indicated at step 404. At step 406, the constant frequency electrical output generated at step 404 may be directly used by the various aircraft system components. This ability to generate an output at a constant frequency may eliminate one or more heavy and burdensome components such as an ATRU, a MFPC, a GCU, or a SCU as shown in step 406.

In addition to providing power to the various aircraft components, the current exemplary embodiment in accordance with the present invention may also capable of proving starting power to the main engine at step 408, as well as the auxiliary power unit at step 410. Finally, at step 412, the current exemplary method may also capable of switching between different sources of electrical output such as the engine electrical output and an auxiliary power output without a break or interruption to the power.

It should be understood, of course, that the foregoing relates to exemplary embodiments of the invention and that modifications may be made without departing from the spirit and scope of the invention as set forth in the following claims.

We claim:

1. An electrical power system comprising:
   a controlled frequency generator configured to generate an engine electrical output responsively to excitation at a frequency that varies as a function of operating speed of the controlled frequency generator; and
   an electrical bus connected to said controlled frequency generator to receive said engine electrical output to yield a bus electrical output;
   wherein said engine electrical output from said controlled frequency generator is at a constant frequency thereby allowing said electrical power system to operate without at least one of an auto transformer rectifier unit, a multifunction power controller, a generator control unit, and a starter control unit.

2. The electrical power system of claim 1, wherein said controlled frequency generator comprises: a main engine starter generator and the electrical power stem includes an excitation power controller configured to vary excitation frequency as a function of an operating speed of said main engine starter generator.

3. The electrical power system of claim 2, wherein said main engine starter generator includes:
   a main generator having a main generator rotor;
   a main generator stator; and
   an exciter generator,
   said main generator rotor having a plurality of main generator rotor windings wound thereon, and said main generator stator having a plurality of main generator stator windings wound thereon.

4. The electrical power system of claim 3, wherein:
   said exciter generator includes an exciter rotor and an exciter stator, said exciter rotor having a second plurality of exciter rotor windings wound thereon, and said exciter stator having a second plurality of exciter stator windings wound thereon; and
   said exciter rotor is configured to provide two phase excitation current to said main generator rotor.

5. The electrical power system of claim 4, further comprising:

a main engine connected to said main engine starter generator;

a hydraulic pump connected to said electrical bus receiving said bus electrical output;

a cabin air compressor connected to a second excitation power controller to receive said bus electrical output; and an auxiliary starter generator connected to said electrical bus, wherein said auxiliary starter generator generates an auxiliary electrical output.

6. The electrical power system of claim 5, wherein said constant frequency is 400 Hz.

7. The electrical power system of claim 5, wherein a second electrical bus is connected to said electrical bus in parallel.

8. The electrical power system of claim 7, wherein said parallel connection of said electrical bus with said second electrical bus allows for said electrical power system to interchangeably switch between said engine electrical output, an alternate engine electrical output, said auxiliary electrical output, or an external electrical output, without a break in the power.

9. The electrical power system of claim 5, wherein said bus electrical output at said constant frequency from said electrical bus is directly used to power said hydraulic pump.

10. The electrical power system of claim 5, wherein said bus electrical output at said constant frequency from said electrical bus is used to power to said cabin air compressor via a second excitation power controller placed between said electrical bus and said cabin air compressor.

11. The electrical power system of claim 5, wherein said bus electrical output at said constant frequency from said electrical bus is used to energize a main engine via said main engine starter generator during a main engine start.

12. The electrical power system of claim 5, wherein said bus electrical output at said constant frequency from said electrical bus is used to energize an auxiliary engine via said auxiliary starter generator during an auxiliary power unit start.

13. A method of providing power to a plurality of aircraft system components in an electrical power system, the method comprising:

driving a starter generator with an engine of the aircraft; and generating electrical output with the starter generator at a constant frequency by changing an excitation frequency as a function of operating speed of the starter generator with an excitation power controller.

14. The method of claim 13, including starting a main engine connected to a main engine starter generator with auxiliary electrical power output from an auxiliary power unit or with external electrical output from an electrical bus, wherein said excitation power controller supplies excitation to an exciter generator of the said main engine starter generator.

15. The method of claim 13 including starting an auxiliary power unit connected to an auxiliary starter generator with said excitation power controller.

16. The method of claim 13, wherein said method is used to achieve a no break power transfer further comprising:

connecting a first electrical bus to said starter generator;

connecting a second electrical bus to said first electrical bus in parallel; and switching between engine electrical output, an alternate engine electrical output, auxiliary electrical output, and an external electrical output without a break;

wherein said parallel connection of said second electrical bus to said first electrical bus creates a alternative path, allowing said switching without said break.

17. An electrical power system comprising:

a controlled frequency generator to generate an engine electrical output;

an excitation power controller configured to change an excitation frequency of the controlled frequency generator as a function of an operating speed of the controlled frequency generator;

an electrical bus connected to said controlled frequency generator to receive said engine electrical output to yield a bus electrical output; and a second electrical bus connected in parallel to said electrical bus;

wherein said electrical output from said controlled frequency generator is at a constant frequency, thereby allowing said electrical power system to operate without at least one of an auto transformer rectifier unit, a multifunction power controller, a generator control unit, and a starter control unit.

18. The electrical power system of claim 17, wherein said controlled frequency generator comprises: a main engine starter generator.

19. The electrical power system of claim 18, wherein said parallel connection of said electrical bus with said second electrical bus allows for said electrical power system to operate continuously without a break in power supply.

* * * * *